UNITED STATES PATENT OFFICE.

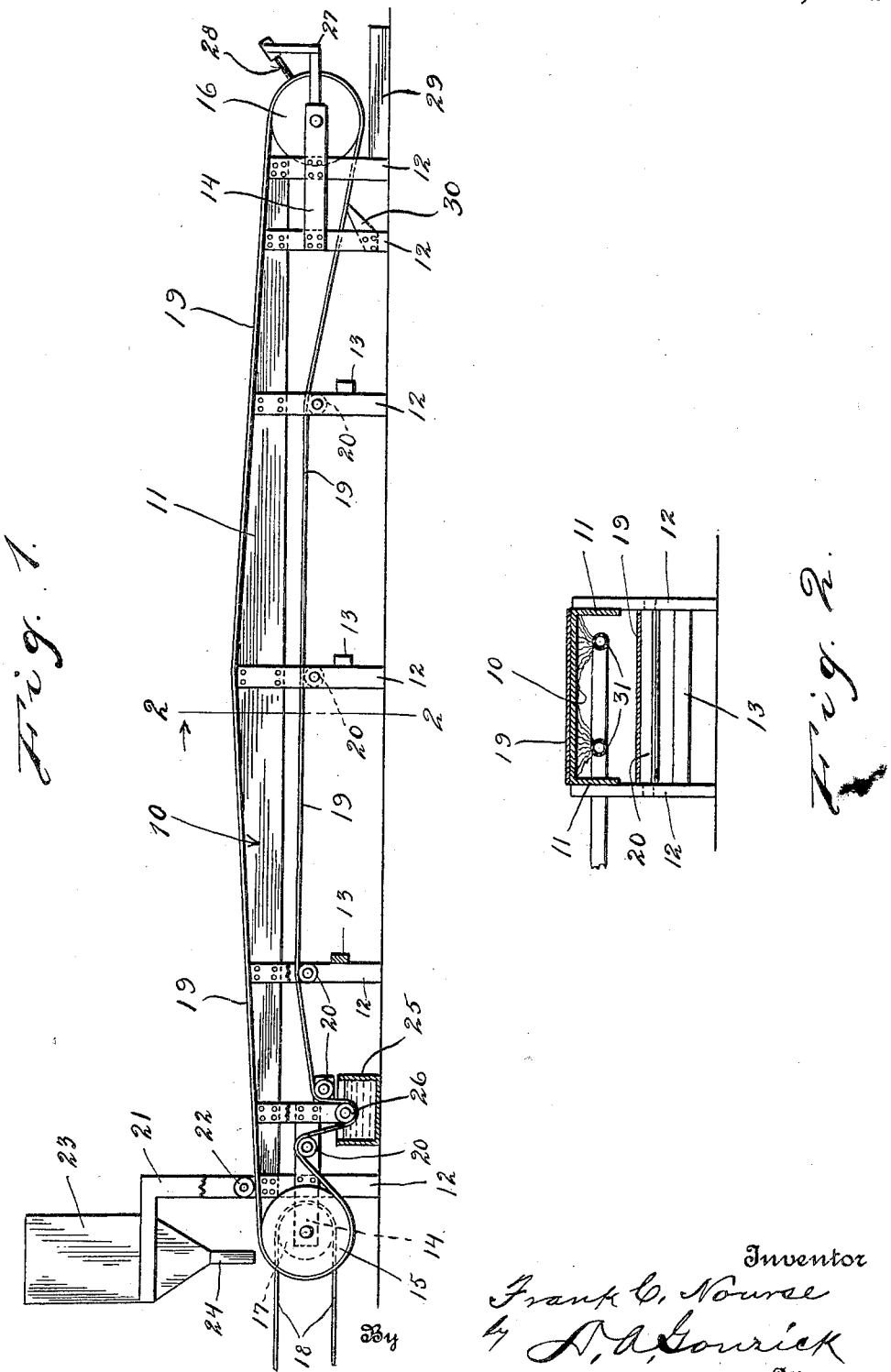

FRANK C. NOURSE, OF BOISE, IDAHO.

DEVICE FOR SEPARATING SEEDS.

1,397,141.  Specification of Letters Patent.  Patented Nov. 15, 1921.

Application filed May 13, 1919. Serial No. 296,820.

*To all whom it may concern:*

Be it known that I, FRANK C. NOURSE, a citizen of the United States, residing at Boise, in the county of Ada and State of Idaho, have invented certain new and useful Improvements in Devices for Separating Seeds, of which the following is a specification.

This invention relates to devices for separating seeds and has for its object the provision of a device for separating clover seed from buckhorn and other undesirable seeds.

It is well known that certain seeds, particularly buckhorn seeds, are coated with a substance which is mucilaginous when moist or wet and in carrying out my invention I propose to take advantage of this fact in effecting a separation of clover seeds from these undesirable seeds.

More specifically, my invention resides in the provision of means whereby the mixed seeds will be fed onto a traveling apron or belt which has been previously moistened and then passing the wet apron over heating means whereby the buckhorn or other mucilaginous seeds will be caused to adhere to the apron or belt, means being provided at the end of the device for brushing off the clover seed without removing the other seeds, and separate means being provided for subsequently scraping off the buckhorn and other seeds.

An important object is the provision of a device of this character which will be simple and inexpensive in manufacture and operation, which will be highly efficient in use, durable in service, and a general improvement in the art.

With the above and other objects and advantages in view the invention consists in the details of construction to be hereinafter more fully described and claimed, and illustrated in the accompanying drawing, in which—

Figure 1 is a somewhat diagrammatic side elevation of my device, parts being broken away and in section, and Fig. 2 is a cross sectional view therethrough on the line 2—2 of Fig. 1.

Referring more particularly to the drawing, the numeral 10 designates an elongated casing formed entirely of sheet metal and having its bottom closed, or open as shown in the drawing, this being a mere detail. The sides 11 of this casing are so formed that the top will be inclined upwardly toward its center from each end. This casing is supported by a frame including a plurality of uprights 12 secured to the casing and connected by cross bars 13.

Secured to the two endmost uprights on each side of the frame are horizontal bars 14 within the ends of which are journaled rollers 15 and 16, the former being the drive roller and being provided with a pulley 17 engaged by a belt 18 whereby the roller 15 may be driven. It will of course be apparent that any other preferred means may be employed for rotating this roller. Trained about the rollers 15 and 16 is an endless belt or apron 19 of canvas or other similar material which has its upper stretch lying closely upon the top of the casing 10, and which has its lower stretch engaging upon guide rollers 20 mounted between the uprights 12. Any suitable belt tightening device may be used in connection with the guide rollers for holding the apron taut. Adjacent the roller 15 the endmost uprights 12 are prolonged upwardly, as shown at 21, and carry a roller 22 bearing upon the top stretch of the apron.

Carried by the members 21 is a feed hopper 23 having a discharge spout 24 disposed above the roller 15. This hopper is adapted to contain the seeds to be separated.

Disposed beneath the casing 10 adjacent the roller 15 is a tank or trough 25 containing water and disposed within this trough is a roller 26 about which the lower stretch of the apron is trained whereby the apron will be passed through the water and effectually moistened prior to its passage around the roller 15.

Carried by the horizontal bars 14 adjacent the roller 16 is a supporting device 27 upon which is mounted a fine brush 28 bearing lightly against the apron. Disposed beneath this brush is a suitable receptacle 29. Secured upon one pair of the uprights adjacent the roller 16 is a transversely extending scraper 30 bearing against the lower stretch of the belt or apron.

The top of the casing may be heated in any desired manner, as by means of steam, electricity or gas burners, though in the present instance I have shown a plurality of longitudinally extending pipes 31 receiving gas from any suitable source and provided with perforations to serve as gas burners.

In the operation of the device power is applied for rotating the roller 15 whereupon the belt 19 will be caused to move over the top of the casing 10 with its lower stretch guided over the rollers 20. As the belt is thus moved it will of course pass under the roller 26 disposed within the water trough 25 and will be effectually moistened. Immediately after being thus wetted, the belt or apron passes over the roller 15 at which time the mixed clover and foreign seeds contained within the hopper 23 are allowed to fall upon the wet belt or apron. In view of the wetness of the apron it will be apparent that all of the seeds will adhere thereto, this adherence being insured by the engagement of the roller 22 upon the belt or apron. It is understood of course that the gas burners 31 or whatever other means is employed for heating the casing 10 are in operation. As the belt carrying the seeds passes over the hot top of the casing the moisture in the belt will be eventually driven off and during this drying of the belt the mucilaginous seeds, such as buckhorn seeds will adhere firmly to the belt whereas the clover seeds will not. As the seeds carried by the belt pass over the roller 16 the clover seeds will be brushed off by the brush 28 and will fall into the receptacle 29 whereas the buckhorn seeds will be unaffected by the brush and will remain on the belt until removed therefrom by the scraper 30. This operation is of course continuous as long as the belt is moving, and as long as seeds are fed thereonto from the hopper 23.

From the foregoing description and a study of the drawing it will be apparent that I have thus provided a very simple and efficient means whereby clover seeds may be separated from buckhorn or other similar undesired seeds.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention what I claim is:

A device of the character described comprising a supporting frame, a casing of inverted trough shape carried by the frame, the top of the casing being closed and being inclined upwardly from its ends to its transverse center, means for applying heat against the underside of the top of the casing, a hopper supported above one end of the frame, rollers journaled at the ends of said frame, means for driving one of said rollers, a water tank disposed beneath the frame, guide rollers beneath said frame, a roller journaled within said tank, a belt trained about said first named rollers, over the guide rollers and under said last named roller, the upper stretch of the belt bearing flat upon the top of the casing, a stationary brush carried by the frame at the end remote from the hopper and bearing lightly against the belt, and a scraper engaging against the lower side of the lower stretch of the belt at a point subsequent to its engagement by the brush.

In testimony whereof I hereto affix my signature.

FRANK C. NOURSE.